(12) United States Patent
Akiyama

(10) Patent No.: US 7,831,880 B2
(45) Date of Patent: Nov. 9, 2010

(54) INFORMATION RECORDING MEDIUM, DEFECT MANAGEMENT METHOD, INFORMATION READING/WRITING DEVICE AND INFORMATION READING DEVICE

(75) Inventor: Minoru Akiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 1180 days.

(21) Appl. No.: 11/338,626

(22) Filed: Jan. 25, 2006

(65) Prior Publication Data

US 2006/0168482 A1    Jul. 27, 2006

(30) Foreign Application Priority Data

Jan. 25, 2005   (JP) .............................. 2005-016343
Jan. 12, 2006   (JP) .............................. 2006-005082

(51) Int. Cl.
*H03M 13/00* (2006.01)
(52) U.S. Cl. ................... 714/746; 714/770; 714/794
(58) Field of Classification Search ................ 714/746, 714/769, 770, 794, 42, 53, 703; 713/194, 713/168, 189; 704/277
See application file for complete search history.

(56) References Cited

U.S. PATENT DOCUMENTS 5,357,381 A * 10/1994 Yasuda et al. ................ 360/53
6,560,749 B1 * 5/2003 Cohen ......................... 714/792
6,615,178 B1 * 9/2003 Tajima ........................ 704/277
6,725,418 B2 * 4/2004 Sawaguchi et al. .......... 714/795
7,027,373 B2 * 4/2006 Ueda et al. ................ 369/53.15

FOREIGN PATENT DOCUMENTS

| EP | 1 132 914    | 9/2001  |
|----|--------------|---------|
| EP | 1 381 047    | 1/2004  |
| EP | 1 460 633    | 9/2004  |
| JP | 62-175020    | 7/1987  |
| JP | 28-12243     | 8/1998  |
| JP | 2000-113643  | 4/2000  |
| JP | 2001-229622  | 8/2001  |
| JP | 2003-346429  | 12/2003 |
| JP | 2004-039076  | 2/2004  |
| JP | 2004-288285  | 10/2004 |

* cited by examiner

Primary Examiner—Fritz Alphonse
(74) Attorney, Agent, or Firm—Dickstein Shapiro LLP

(57) ABSTRACT

To specify defect management information to be used in a short time in an information recording medium having a defect information area capable of recording plural sets of defect management information and a selection information area capable of recording plural sets of selection information for selecting a set of defect management information from the defect information area. The selection information includes information about a position where the latest management information at the time of writing is written, and history information indicating that the selection information is updated.

13 Claims, 10 Drawing Sheets

FIG. 3

| | | FIRST PSN | LAST PSN | NUMBER OF BLOCKS |
|---|---|---|---|---|
| | DMA MANAGER AREA 1-1 | 2CE00 | 2CE1F | 1 |
| | Reserved | 2CE20 | 2CE5F | 2 |
| | DMA MANAGER AREA 1-2 | 2CE60 | 2CE7F | 1 |
| | Reserved | 2CE80 | 2CEBF | 2 |
| | ...... | | | |
| | DMA MANAGER AREA 1-10 | 2D160 | 2D17F | 1 |
| | Reserved | 2D180 | 2D1BF | 2 |
| | DMA 1-1 | 2D1C0 | 2D1FF | 2 |
| | Reserved | 2D200 | 2D21F | 1 |
| | DMA 2-1 | 2D220 | 2D25F | 2 |
| | Reserved | 2D260 | 2D27F | 1 |
| | DMA 1-2 | 2D280 | 2D2BF | 2 |
| | Reserved | 2D2C0 | 2D2DF | 1 |
| LEAD-IN | DMA 2-2 | 2D2E0 | 2D31F | 2 |
| | Reserved | 2D320 | 2D33F | 1 |
| | ...... | | | |
| | DMA 1-48 | 2F500 | 2F53F | 2 |
| | Reserved | 2F540 | 2F55F | 1 |
| | DMA 2-48 | 2F560 | 2F59F | 2 |
| | Reserved | 2F5A0 | 2F5BF | 1 |
| | DMA 1-49 | 82CE00 | 82CE3F | 2 |
| | Reserved | 82CE40 | 82CE5F | 1 |
| | DMA 2-49 | 82CE60 | 82CE9F | 2 |
| | Reserved | 82CEA0 | 82CEBF | 1 |
| | ...... | | | |
| | DMA 1-100 | 82F440 | 82F47F | 2 |
| | Reserved | 82F480 | 82F49F | 1 |
| | DMA 2-100 | 82F4A0 | 82F4DF | 2 |
| | Reserved | 82F4E0 | 82F4FF | 1 |

FIG. 4

| | | FIRST PSN | LAST PSN | NUMBER OF BLOCKS |
|---|---|---|---|---|
| LEAD-IN | DMA MANAGER AREA 2-1 | 4ED740 | 4ED75F | 1 |
| | Reserved | 4ED760 | 4ED79F | 2 |
| | DMA MANAGER AREA 2-2 | 4ED7A0 | 4ED7BF | 1 |
| | Reserved | 4ED7C0 | 4ED7FF | 2 |
| | ...... | | | |
| | DMA MANAGER AREA 2-10 | 4EDAA0 | 4EDABF | 1 |
| | Reserved | 4EDAC0 | 4EDAFF | 2 |
| | DMA 3-1 | 4EDB00 | 4EDB3F | 2 |
| | Reserved | 4EDB40 | 4EDB5F | 1 |
| | DMA 4-1 | 4EDB60 | 4EDB9F | 2 |
| | Reserved | 4EDBA0 | 4EDBBF | 1 |
| | DMA 3-2 | 4EDBC0 | 4EDBFF | 2 |
| | Reserved | 4EDC00 | 4EDC1F | 1 |
| | DMA 4-2 | 4EDC20 | 4EDC5F | 2 |
| | Reserved | 4EDC60 | 4EDC7F | 1 |
| | ...... | | | |
| | DMA 3-48 | 4EFE40 | 4EFE7F | 2 |
| | Reserved | 4EFE80 | 4EFE9F | 1 |
| | DMA 4-48 | 4EFEA0 | 4EFEDF | 2 |
| | Reserved | 4EFEE0 | 4EFEFF | 1 |
| | DMA 3-49 | CED740 | CED75F | 2 |
| | Reserved | CED780 | CED79F | 1 |
| | DMA 4-49 | CED7A0 | CED7DF | 2 |
| | Reserved | CED7E0 | CED7FF | 1 |
| | ...... | | | |
| | DMA 3-100 | CEFD80 | CEFDBF | 2 |
| | Reserved | CEFDC0 | CEFDDF | 1 |
| | DMA 4-100 | CEFDE0 | CEFE1F | 2 |
| | Reserved | CEFE20 | CEFE3F | 1 |

FIG. 5

| BYTE POSITION (BP) | CONTENTS | NUMBER OF BYTES |
|---|---|---|
| 0 to 1 | Identifier (0010h) | 2 bytes |
| 2 to 3 | Reserved | 2 bytes |
| 4 to 7 | DMA Manager Update Counter | 4 bytes |
| 8 to 11 | First PSN of current DMA1 | 4 bytes |
| 12 to 15 | First PSN of current DMA2 | 4 bytes |
| 16 to 19 | First PSN of current DMA3 | 4 bytes |
| 20 to 23 | First PSN of current DMA4 | 4 bytes |
| 24 to 63 | Reserved | 40 bytes |

FIG. 10

| BYTE POSITION (BP) | CONTENTS | NUMBER OF BYTES |
|---|---|---|
| 0 to 1 | Identifier (0010h) | 2 bytes |
| 2 to 7 | Reserved | 6 bytes |
| 8 to 11 | First PSN of current DMA1 | 4 bytes |
| 12 to 15 | First PSN of current DMA2 | 4 bytes |
| 16 to 19 | First PSN of current DMA3 | 4 bytes |
| 20 to 23 | First PSN of current DMA4 | 4 bytes |
| 24 to 31 | Reserved | 8 bytes |
| 32 to 39 | DMA Manager Update Flag | 8 bytes |
| 40 to 63 | Reserved | 24 bytes |

INFORMATION RECORDING MEDIUM, DEFECT MANAGEMENT METHOD, INFORMATION READING/WRITING DEVICE AND INFORMATION READING DEVICE

BACKGROUND OF THE INVENTION

1. Field of the Invention

The present invention relates to an information recording medium such as an optical disc medium having a defect information area, a defect management method for managing defect management information written on a defect information area, an information reading/writing device and an information reading device in which an information recording medium having a defect information area is used.

2. Related Art

A kind of optical disc medium has a user area for storing user data and a spare area which is reserved, and is so configured as to perform alternation processing for replacing a defect area caused in the user area with a sound area in the spare area. An area for recording defect management information relating to the alternation processing is called DMA (defect management area) which requires high reliability.

Each time the alternation processing is performed, replacement information is added, so defect management information which should be written on the DMA must be updated, whereby overwrite frequency of the DMA is relatively high. For example, a DVD-RAM is so adapted that overwrite of a DMA is possible for more than one-hundred thousands times, and DMAs storing the same contents are provided at four locations so as to secure high reliability.

On the other hand, in an information recording medium with low durability against overwrite, such countermeasures as disclosed in the publication of Japanese Patent Application Laid-open No. 2004-39076 (Patent Document 1) and the publication of Japanese Patent Application Laid-open No. 2004-288285 (Patent Document 2) are proposed.

Patent Document 1 discloses a method of securing reliability of defect management information in which a plurality of DMAs, on which defect management information of the same content is written, forms a set of DMAs (DMA set), and a defect information area is prepared in which a plurality of DMA sets are provided, and when a DMA set in use is deteriorated to be defective due to overwrite, another DMA set within the defect information area is used so as to secure reliability.

Patent Document 2 discloses a system in which, besides a defect information area consisting of a plurality of DMA sets capable of recording defect management information, there is provided a selection information area for recording selection information indicating a DMA set on which the latest defect management information within the defect information area is written, and based on the selection information of the DMA set stored on the selection information area, the DMA set on which the latest defect management information is written is specified in a short time. The selection information is called a DMA manager. The DMA manager is written on a DMA manager area. Similar to the case of writing the defect management information, a plurality of DMA manager areas on which selection information of the same content for selecting a DMA set is recorded forms a set of DMA managers (DMA manager set), whereby it is possible to enhance reliability of the selection information for selecting a DMA set. Further, by constituting the selection information area so as to include a plurality of DMA manager sets, it is also possible to cope with deterioration of a DMA manager set due to overwrite.

However, in a case of adopting a configuration in which a DMA manager set consists of a plurality of DMA manager areas, there has been a following problem.

That is, when updating selection information of the DMA set, there may be a case where the selection information cannot be written on a part of the DMA manager areas due to such reasons as a halt of an information reading/writing device due to sudden power discontinuity or reset, and disc recording defect due to stains on the disc surface of the optical disc medium. In such a case, an abnormal state is caused, that is, selection information written on a DMA manager area does not match with selection information written on another DMA manager area in the information recording medium while those DMA manager areas belong to the same DMA manager set. In such a case, reliable selection information cannot be obtained. When the selection information cannot be obtained, although it is possible to select the latest DMA set by directly searching DMA sets, it takes long time to obtain the result if the number of DMA sets to be searched is large.

SUMMARY OF THE INVENTION

It is therefore an object of the present invention to provide an information recording medium or the like capable of improving reliability of selection information in a configuration having a selection information area capable of recording plural sets of selection information for selecting a set of defect management information.

In order to achieve the object, an information recording medium according to the present invention is an information recording medium having an information area for managing a defect of a data area. The information area includes a defect information area capable of recording plural sets of management information of a defect caused in the data area, and a selection information area capable of recording plural sets of selection information for selecting a set of defect management information from the defect information area. The selection information is information indicating a written position of the latest defect management information at the time of writing the selection information is written, and the selection information includes history information indicating that the selection information is updated.

As the history information, there may be used update number data which is counted each time the selection information is updated, or flag data in which a bit of the same number as the update number of the selection information is set to 0 or 1, for example.

Therefore, according to the present invention, by adding history information indicating that the selection information is updated to the selection information, it is possible to grasp the latest selection information from the history information even in an abnormal state where, for example, selection information written on a DMA manager area does not match with selection information written on another DMA manager area in the information recording medium while those DMA manager areas belong to the same DMA manager set. Further, by using the history information as searching information, it becomes easy to grasp the latest selection information. Associating with it, defect management information to be used can be specified securely in a short time.

Further, a defect management method for an information recording medium of the present invention uses the information recording medium having a defect information area and a selection information area. The defect management area is able to be recorded with plural sets of management information of a defect caused in the data area. The selection information area is able to be recorded plural sets of selection information for selecting a set of the defect management information from the defect information area. The method comprises the step of writing management information of a defect caused in the data area of the information recording medium onto the defect information area and the step of writing the selection information indicating a written position of the latest defect management information written on the defect information area, including history information indicating the selection information is updated.

Further, a defect management method for an information recording medium of the present invention uses, as the information recording medium, one which has an information area including a defect information area on which plural sets of management information of a defect caused in the data area are recorded and a selection information area on which plural sets of selection information for selecting a set of latest defect management information from the defect information area are recorded, and in which the selection information includes history information indicating that the selection information is updated. The method comprises the step of specifying the latest selection information from the plural sets of selection information written on the selection information area based on the history information.

Further, a defect management method for an information recording medium of the present invention comprises the steps of: selecting a candidate of the latest selection information from the plural sets of selection information written on the selection management area based on the history information; and specifying the latest defect management information from the plural sets of defect management information written on the defect information area based on the selection information selected as the candidate.

Further, an information reading/writing device of the present invention for reading and writing data from/to a data area of an information recording medium uses, as the information recording medium, one which has an information area including a defect information area capable of recording plural sets of management information of a defect caused in the data area and a selection information area capable of recording plural sets of selection information for selecting a set of defect management information from the defect information area. The device comprises: a defect management unit for reading management information of a defect caused in the data area from a defect information area of the information recording medium, storing the defect management information, and writing the defect management information onto the defect information area of the information recording medium; a selection management unit for reading, from the selection information area of the information recording medium, selection information for selecting a set of defect management information from the defect information area, storing the selection information, and writing the selection information onto the selection information area of the information recording medium; and a control unit for controlling reading and writing of data performed to the data area based on information written on the defect information area and the selection information area. The selection management unit has a function of writing the selection information, which is information indicating the written position of the latest defect management information written within the defect information area, including history information indicating that the selection information is updated.

Further, an information reading/writing device of the present invention uses, as the information recording medium, one which has an information area including a defect information area capable of recording plural sets of management information of a defect caused in the data area and a selection information area capable of recording plural sets of selection information for selecting a set of defect management information from the defect information area, and in which the selection information includes history information indicating that the selection information is updated. The device comprises: a defect management unit for reading management information of a defect caused in the data area from the defect information area of the information recording medium, storing the defect management information, and writing the defect management information onto the defect information area of the information recording medium; a selection management unit for reading, from the selection information area of the information recording medium, selection information for selecting a set of defect management information from the defect information area, storing the selection information, and writing the selection information onto the selection information area of the information recording medium; and a control unit for controlling reading and writing of data performed to the data area based on information written on the defect information area and the selection information area. The selection management unit has a function of specifying the latest selection information from the plural sets of selection information written on the selection information area based on the history information.

Further, in the information reading/writing device of the present invention, the selection management unit has a function of selecting a candidate of the latest selection information from the plural sets of selection information written on the selection information area based on the history information, and the defect management unit has a function of specifying the latest defect management information from the plural sets of defect management information written on the defect information area based on the selection information selected as the candidate.

Further, an information reading device of the present invention for reading data from a data area of an information recording medium uses, as the information recording medium, one which has an information area including a defect information area capable of recording plural sets of management information of a defect caused in the data area and a selection information area capable of recording plural sets of selection information for selecting a set of defect management information from the defect information area, and in which the selection information includes history information indicating that the selection information is updated. The device comprises: a defect management unit for reading management information of a defect caused in the data area from the defect information area of the information recording medium, and storing the defect management information; a selection management unit for reading, from the selection information area of the information recording medium, selection information for selecting a set of defect management information from the defect information area, and storing the selection information; and a control unit for controlling reading of data from the data area based on information written on the defect information area and the selection information area. The selection management unit has a function of specifying the latest selection information from the plural sets of selection information written on the selection information area based on the history information.

Further, in the information reading device of the present invention, the selection management unit has a function of selecting a candidate of the latest selection information from the plural sets of selection information written on the selection information area based on the history information, and the defect management unit has a function of specifying the latest defect management information from the plural sets of defect management information written on the defect information area based on the selection information selected as the candidate.

EFFECTS OF THE INVENTION

As described above, according to the present invention, in an information recording medium having a defect information area on which plural sets of defect management information are written and a selection information area on which plural sets of selection information for selecting a set of defect management information are written from the defect information area, history information indicating that the selection information is updated is added to the selection information. Thereby, it is possible to grasp the latest selection information surely and easily by using the history information as searching information so as to specify defect management information to be used in a short time.

BRIEF DESCRIPTION OF THE DRAWINGS

FIG. 3 shows the configuration of an area MAN 1 and areas DMA 1 and 2 in the information recording medium according to the embodiment 1 of the present invention;

FIG. 4 shows the configuration of an area MAN 2 and areas DMA 3 and 4 in the information recording medium according to the embodiment 1 of the present invention;

FIG. 5 shows the data structure of an information unit of 64 bytes constituting selection information in the information recording medium according to the embodiment 1 of the present invention;

FIG. 10 shows the data structure of an information unit of 64 bytes constituting selection information in an information recording medium according to an embodiment 2 of the present invention.

DESCRIPTION OF PREFERRED EMBODIMENTS

Hereinafter, embodiments of the present invention will be explained in detail based on the drawings.

An information recording medium according to an embodiment of the present invention includes, as the basic configuration, an information area having a defect information area capable of recording plural sets of management information about defects caused in a data area, and a selection information area capable of recording plural sets of selection information for selecting a set of defect management information from the defect information area. The selection information is information indicating a position where the latest defect management information at the time of writing the selection information is written. The selection information includes history information indicating that the selection information is updated.

Embodiment 1

Next, a specific example of an information recording medium according to an embodiment of the present invention will be explained as an embodiment 1. As an information recording medium having an information area for managing defects of a data area according to the present embodiment shown in FIG. 1, a readable/writable optical disc medium is used. Note that the information recording medium is not limited to an optical disc medium. Any information recording media may be used provided that it is adapted to record information about defects of the information recording medium on the information area so as to perform defect management. Further, the data area includes a user area and spare areas 1 and 2 shown in FIG. 1.

Figure 1:
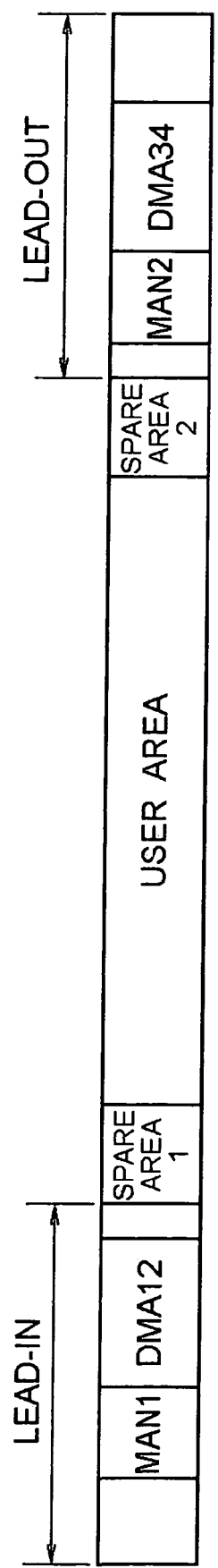
FIG. 1 is a schematic diagram showing the data structure of an information recording medium according to an embodiment 1 of the present invention.

Data written on the optical disc medium shown in FIG. 1 is made into blocks by 64 k bytes, and ECC (error correction code) or the like is added thereto by a predetermined procedure, and is written by blocks. Further, when data written on the optical disc medium is read, the data is read out by 64 k bytes while errors are corrected. The block is called an ECC block. One ECC block corresponds to 32 pieces of sectors, so with an advance of one ECC block on the optical disc medium, PSN (physical sector number) which is address information advances 20 h.

Figure 2A:
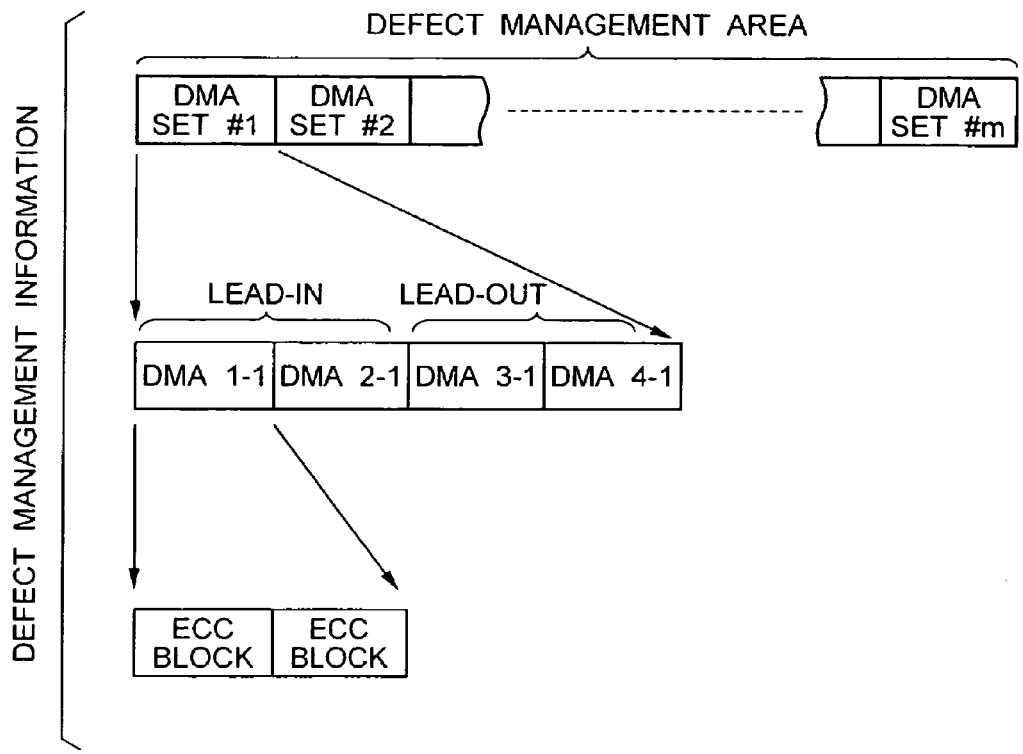
FIG. 2A and 2B are schematic diagrams showing the data structure of an information recording medium according to an embodiment 1 of the present invention.
Figure 2B:
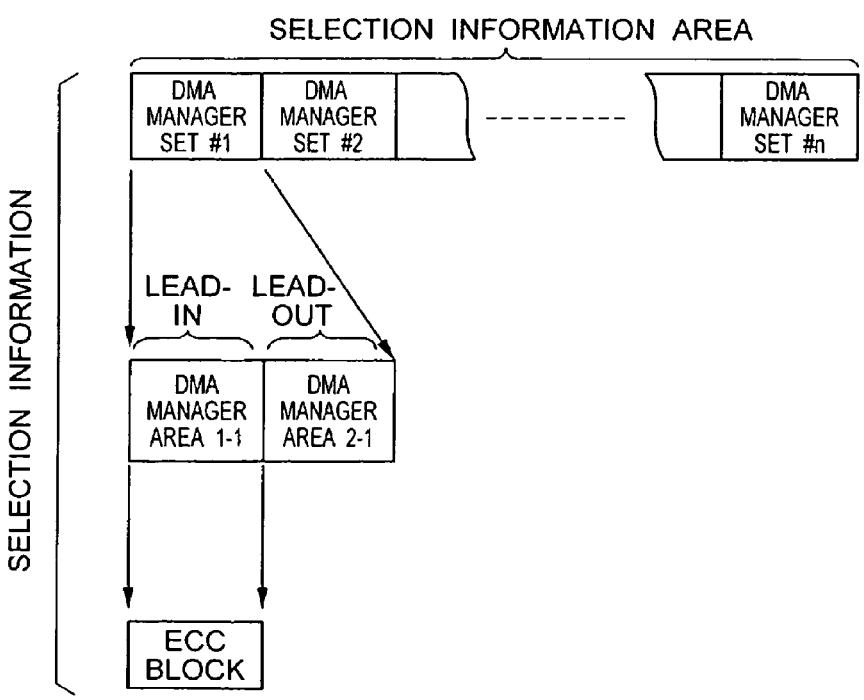

In the optical disc medium shown in FIG. 1, the selection information area consists of ten DMA manager sets #1 to #10 as shown in FIG. 2B, and the $n^{th}$ DMA manager set #n consists of two DMA manager areas (1-n, 2-n). Further, as shown in FIG. 2A, the defect information area consists of one-hundred DMA sets #1 to #100, and the $m^{th}$ DMA set #m consists of four DMAs (1-m, 2-m, 3-m, 4-m), respectively.

As shown in FIG. 2B, each DMA manager area is an area having a size of one ECC block, and is capable of recording selection information. On the two DMA manager areas (1-n, 2-n) belonging to the nth DMA manager set, selection information of the same content is written. Further, as shown in FIG. 2A, each DMA is an area having a size of two ECC blocks, and is capable of recording defect management information. On the four DMAs (1-m, 2-m, 3-m, 4-m) belonging to the $m^{th}$ DMA set, defect management information of the same content is written.

A lead-in area MAN 1 on the inner side of the optical disc medium shown in FIG. 1 is provided with one DMA manager area (1-1 to 1-10) of the two DMA manager areas belonging to a DMA manager set. A lead-out area MAN 2 on the outer side is provided with the other DMA manager area (2-1 to 2-10). Further, a lead-in area DMA 12 in the optical disc medium is provided with two DMAs (1-1, 2-1 to 1-100, 2-100) of the four DMAs belonging to a DMA set, and a lead-out area DMA 34 on the outer side is provided with the other two DMAs (3-1, 4-1 to 3-100, 4-100).

FIG. 3 shows the detailed arrangement of the lead-in areas MAN 1 and DMA 12. Further, FIG. 4 shows the detailed arrangement of the lead-out areas MAN 2 and DMA 34. Note that the numbers of DMA sets and DMA manager sets are not limited to those shown in FIGS. 2A, 2B, 3 and 4. Further, the number of DMAs belonging to a DMA set and the number of DMA manager areas belonging to a DMA manager set are not limited to those shown in FIGS. 2A, 2B, 3 and 4.

In the lead-in area MAN 1 of the optical disc medium shown in FIG. 3, an area in which the first PSN is 2CE00h and the last PSN is 2CE1Fh (one ECC block) is assigned to a DMA manager area 1-1. Further, an area in which the first PSN is 2CE60h and the last PSN is 2CE7Fh (one ECC block) is assigned to a DMA manager area 1-2. Similarly, assignment is performed for DMA manager areas 1-3 through 1-9, and an area in which the first PSN is 2D160h and the end PNS is 2D17Fh (one ECC block) is assigned to the last DMA manager area 1-10.

In the lead-in area DMA 12 of the optical disc medium shown in FIG. 3, an area in which the first PSN is 2D1C0h and the last PSN is 2D1FFh (two ECC blocks) is assigned to a DMA 1-1. Further, an area in which the first PSN is 2D220h and the last PSN is 2D25Fh (two ECC blocks) is assigned to a DMA 2-1. Similarly, assignment is performed to DMAs 1-2, 2-2 through 1-99, 2-99, 1-100, and an area in which the first PSN is 82F4A0h and the last PSN is 82F4DFh (two ECC blocks) is assigned to the last DMA 2-100.

In the lead-out area MAN 2 of the optical disc medium shown in FIG. 4, an area in which the first PSN is 4ED740h and the last PSN is 4ED75Fh (one ECC block) is assigned to a DMA manager area 2-1. Further, an area in which the first PSN is 4ED7A0h and the last PSN is 4ED7BFh (one ECC block) is assigned to a DMA manager area 2-2. Similarly, assignment is performed to DMA manager areas 2-3 through 2-9, and an area in which the first PSN is 4EDAA0h and the last PSN is 4EDABFh (one ECC block) is assigned to the last DMA manager area 2-10.

In the lead-out area DMA 34 of the optical disc medium shown in FIG. 4, an area in which the first PSN is 4EDB00h and the last PSN is 4EDB3Fh (two ECC blocks) is assigned to a DMA 3-1. Further, an area in which the first PSN is 4EDB60h and the last PSN is 4EDB9Fh (two ECC blocks) is assigned to a DMA 4-1. Similarly, assignment is performed to DMAs 3-2, 4-2 through 3-99, 4-99 and 3-100, and an area in which the first PSN is CEFDE0h and the last PSN is CEFE1Fh (two ECC blocks) is assigned to the last DMA 4-100.

In this optical disc medium, each DMA manager area stored on each of the areas MAN 1 and MAN 2 corresponds to one ECC block, and each DMA secured by each of the areas DMA 12 and DMA 34 corresponds to two ECC blocks (see FIGS. 2A and 2B).

The selection information written on the respective two DMA manager areas has a data structure in which an information unit of 64 bytes shown in FIG. 5 is repeated for 1024 times. The selection information is information for selecting a DMA set, indicating the position where the latest defect management information at the time of writing the selection information is written. That is, as shown in FIG. 5, an information unit of 64 bytes includes an identifier (0010h), first PSNs for four DMAs as positional information of the DMA set in use, and a DMA manager update counter which is an area for storing data of the update number counter value in the byte position 4 to 7. The value of the DMA manager update counter (update number data) is initialized to 00h when the optical disc medium is initialized, and is incremented (+1) each time the content of the selection information is updated. Therefore, it is possible to determine a DMA manager set on which selection information having the largest value of the DMA manager update counter is written as a DMA manager set on which the latest selection information is written.

In the explanation given above, the value of the DMA manager update counter of the embodiment 1 corresponds to history information indicating that the selection information is updated.

Further, although the value of the DMA manager update counter is configured to be incremented (+1) for each update, it is not limited to this configuration. The value of the DMA manager update counter may be configured to be decremented (−1) for each update. In the case of the value being decremented as described above, the value of the DMA manager update counter (update number data) is initialized to be the maximum value when the optical disc medium is initialized, and a DMA manager set, on which selection information that the value of the DMA manager update counter is the minimum is written, becomes a DMA manager set on which the latest selection information is written. Further, the value of the DMA manager update counter may be so configured that it is not initialized at the time of initialization of the optical disc medium and succeeds the value before initialization. Further, the value of the DMA manager update counter (update number data) may be counted each time the DMA manager area is overwritten even if the content of the selection information is not updated.

Embodiment 2

In the optical disc medium according to the embodiment 1, update number data (value of DMA manager update counter) counted each time the selection information is updated is used as history information, as shown in FIG. 5. However, history data is not limited to this. As shown in FIG. 10, as history information, flag data in which a bit having the same number as the number of updates of the selection information is set to be 0 or 1 may be used. A specific explanation will be given.

An information recording medium according to the present embodiment uses a readable/writable optical disc medium as an example, same as the embodiment 1. As shown in FIG. 10, the optical disc medium according to the present embodiment is different from the optical disc medium of the embodiment 1 in the configuration of selection information. The selection information has a data structure in which an information unit of 64 bytes is repeated for 1024 times, and is written on two DMA manager areas. An information unit of 64 bytes includes an identifier (0010h), first PNSs of four DMAs as positional information of the DMA set in use, and a DMA manager update flag which is an area for storing flag data in which the number of updates is shown by the number of bit that the value is 1 on the byte position 32 to 39. In the DMA manager update flag, every bit is initialized to 0 when the optical disc medium is initialized, and then when the content of the selection information is updated, bit 0 of the byte 32 is changed to a value 1, and when the content of the selection information is updated further, bit 0 and bit 1 of the byte 32 is changed to a value 1. Thereafter, each time the selection information is updated, the number of bits having the value 1 is increased in the DMA manager update flag. In the present embodiment, it is determined that selection information having a DMA manager update flag in which the number of bits with the value 1 is the largest is the latest. As described above, history information included in the selection information in the embodiment shown in FIG. 10 is flag data in which the bit of the same number as the number of updates of the selection information has a value 1.

Further, the DMA manager update flag may be so configured to initialize every bit to 1 when the optical disc medium is initialized, and each time the selection information is updated, the number of bits having the value 0 is increased in the DMA manager update flag. In this case, it is determined that selection information having a DMA manager update flag in which the number of bits having the value 0 is the largest is the latest.

Embodiment 3

Next, by using the information recording medium according to the embodiment, an information reading/writing device according to the embodiment of the present invention for reading and writing data from/to the data area thereof (user area and spare area) will be explained as an embodiment 3.

Figure 9:
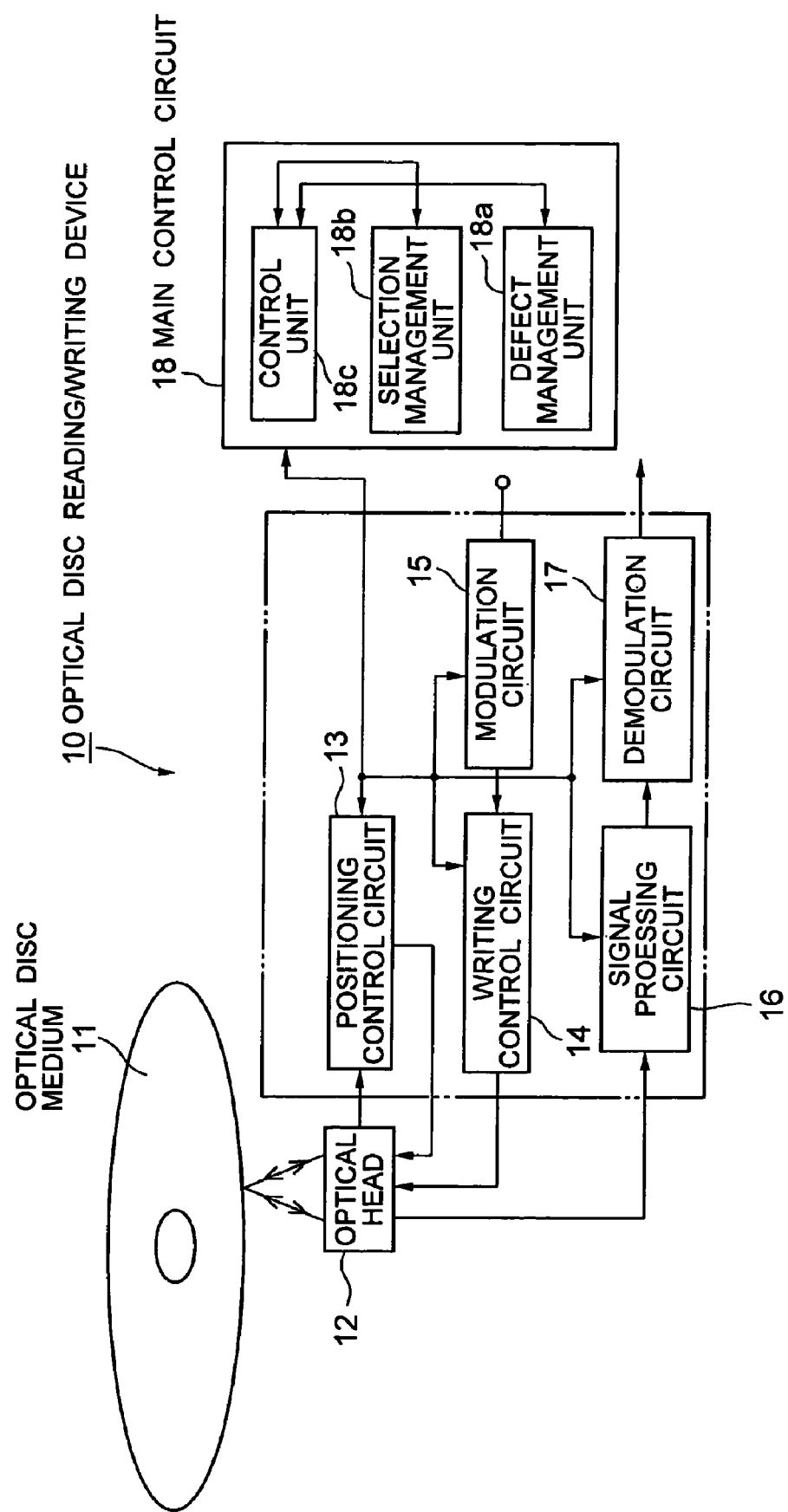
FIG. 9 is a block diagram showing an information reading/writing device according to an embodiment 3 of the present invention.

As shown in FIG. 9, the information reading/writing device of the present embodiment is an optical disc reading/writing device 10 having a function of writing data onto an optical disc medium 11 as the information recording medium shown in FIG. 1 or reading data written thereon. The optical disc reading/writing device 10 includes an optical head 12, a positioning control circuit 13, a writing control circuit 14, a modulation circuit 15, a signal processing circuit 16, a demodulation circuit 17 and a main control circuit (drive controller) 18.

The main control circuit 18 includes: a defect management unit 18a for controlling reading and writing of defect management information about defects caused in a data area of the optical disc medium 11, performed to a defect information area (defect information area shown in FIG. 2A) of the optical disc medium 11; a selection management unit 18b for controlling reading and writing of selection information for selecting a set of defect management information from the defect information area of the optical disc medium 11, performed to a selection information area (selection information area shown in FIG. 2B) of the optical disc medium 11; and a control unit 18c for controlling reading and writing of data performed to the data area based on information written on the defect information area and the selection information area.

Although the connection relationship is not shown in FIG. 9, the defect management unit 18a, the selection management unit 18b and the control unit 18c of the main control circuit 18 have a function of controlling the optical head 12, the positioning control circuit 13, the writing control circuit 14, the modulation circuit 15, the signal processing circuit 16 and the demodulation circuit 17. Further, when controlling writing of the data, the control unit 18c has a function of performing alternation processing for replacing a defect area caused in the user area (including the spare area) within the optical disc medium 11 with another sound area in the spare area.

The main control circuit 18 consists of a CPU (central processing unit), and it is so configured that the CPU reads out programs stored on a memory sequentially so as to perform functions of the defect management unit 18a, the selection management unit 18b and the control unit 18c.

First, operation of writing data onto the optical disc medium 11 by the optical disc reading/writing device 10 shown in FIG. 9 will be explained. When record data is inputted from the outside, the modulation circuit 15 divides the record data into blocks by 64 k bytes, and adds information such as ECC to the blocked data following a predetermined procedure to thereby modulate it into record data of a channel bit string, under the control of the control unit 18c.

When the writing control circuit 14 receives the record data of a channel bit string from the modulation circuit 15, the writing control circuit 14 controls the optical head 12 based on the record data, and writes record data corresponding to the channel bit string onto the optical disc medium 11, under the control of the control unit 18c. Operation of writing data onto the optical disc medium 11 will be explained specifically.

When writing data, it is required to know whether the area on which the data is to be written is subject to alternation processing. Therefore, the selection management unit 18b controls the optical head 12, the positioning control circuit 13, the signal processing circuit 16 and the demodulation circuit 17 so as to read out selection information written on the selection information area (FIG. 2B) of the optical disc medium 11. Further, the defect management unit 18a controls the optical head 12, the positioning control circuit 13, the signal processing circuit 16 and the demodulation circuit 17 so as to read out defect management information written on the defect information area (FIG. 2A) of the optical disc medium 11. The defect management unit 18a stores the latest defect management information and provides the control unit 18c with the defect management information. Readout of selection information and defect management information may be omitted provided that the selection management unit 18b and the defect management unit 18a store the latest selection information and defect management information about the optical disc medium 11.

The control unit 18c computes positional information of the area on which writing is to be done based on defect management information, and outputs the positional information to the positioning control circuit 13.

When writing data onto the optical disc medium 11, the positioning control circuit 13 positions a laser beam outputted from the optical head 12 at a position where writing should be done, under the control of the control unit 18c. The writing control circuit 14 controls the optical head 12 corresponding to a channel bit string outputted from the modulation circuit 15, under the control of the control unit 18c. The optical head 12 emits a laser beam to a position, where writing should be done, of the optical disc medium 11, and writes record data corresponding to the channel bit string on a record surface of the optical disc medium 11.

In a case where it is required to verify whether the written data can be read out normally, verifying operation will be performed successively. If verification will not be performed, the operation of writing data onto the optical disc medium 11 is completed at this point.

When performing verification, the control unit 18c controls the optical head 12, the signal processing circuit 16 and the demodulation circuit 17 so as to verify the record result of the record data written on the optical disc medium 11. That is, the record data on the optical disc medium 11 is read out by the optical head 12, and the signal is processed by the signal processing circuit 16, and the processed signal is inputted into the demodulation circuit 17. The demodulation circuit 17 outputs the processing state of the readout data from the optical disc medium 11 to the control unit 18c. When the demodulation circuit 17 was able to process the readout data normally, the control unit 18c determines it is verified that writing has been completed normally. In such a case, the operation of writing data onto the optical disc medium 11 is completed at this point.

On the other hand, when the demodulation circuit 17 determines that the written data includes abnormality, the control unit 18c performs the alternation processing. That is, when the control unit 18c is notified from the demodulation circuit 17 that written data includes abnormality, the control unit 18c determines that the area is a defect area. Further, based on defect management information provided from the defect management unit 18a, the control unit 18c makes the transition to a processing mode for replacing the defect area caused in the user area with a sound area within the spare area.

The control unit 18c assigns a new alteration destination area within the spare area corresponding to the defect area which has been newly found, and outputs positional information thereof to the positioning control circuit 13. When the positioning control circuit 13 receives the positioning information from the control unit 18c, the positioning control circuit 13 drives the optical head 12 so as to control the focusing position of the laser beam performed by the optical head 12. The control unit 18c rewrites the record data onto the record surface of the optical disc medium 11 by using the modulation circuit 15 and the writing control circuit 14.

For verification, the control unit 18c reads out the data from the alternation destination area on which the data is written, and causes the signal processing circuit 16 and the demodulation circuit 17 to process the readout signal. When the control unit 18c receives a signal from the demodulation circuit 17 indicating that it is determined the readout has been completed normally, the control unit 18c notifies the defect management unit 18a of the new alternation processing having been performed, the defect area newly found, and information about the corresponding alternation destination area to thereby cause the defect management unit 18a to update the defect management information. When the defect management information was able to be updated normally, the operation of writing the data onto the optical disc medium 11 is completed.

Next, operation of reading record data on the optical disc medium 11 by the optical disc reading/writing device 10 will be explained. The optical head 12 emits a laser beam to the optical disc medium 11 and reads out record data, and outputs the data to the signal processing circuit 16.

The signal processing circuit 16 converts the data inputted from the optical head 12 into a channel bit string, under the control of the control unit 18c. The modulation circuit 17 performs processing such as error correction to the data of a channel bit string inputted from the signal processing circuit 16 by 64 k bytes, and outputs it as readout data to the outside, under the control of the control unit 18c. Operation of reading data from the optical disc medium 11 will be explained specifically.

When reading data, it is required to know whether the area from which the data is to be read out is subject to alternation processing. Therefore, the selection management unit 18b controls the optical head 12, the positioning control circuit 13, the signal processing circuit 16 and the demodulation circuit 17 so as to read out selection information written on the selection information area (FIG. 2B) of the optical disc medium 11. Further, the defect management unit 18a controls the optical head 12, the positioning control circuit 13, the signal processing circuit 16 and the demodulation circuit 17 so as to read out defect management information written on the defect information area (FIG. 2A) of the optical disc medium 11. The defect management unit 18a stores the latest defect management information and provides the control unit 18c with the defect management information. Readout of selection information and defect management information may be omitted provided that the selection management unit 18b and the defect management unit 18a store the latest selection information and defect management information about the optical disc medium 11.

The control unit 18c computes positional information of the area from which reading is to be done based on defect management information, and outputs the positional information to the positioning control circuit 13.

When the positioning control circuit 13 receives positional information from the control unit 18c, the positioning control circuit 13 drives the optical head 12 so as to position the laser beam from the optical head 12 at a location from which reading should be performed. The optical head 12 reads out written data from the optical disc medium 11. The signal read out from the optical head 12 is processed by the signal processing circuit 16 and the demodulation circuit 17 respectively, and outputted to the outside. Through this processing, even data which is written by being replaced from the defect user area to the normal spear area is read out securely under the control of the control unit 18c.

In the above description, operation of writing data onto the optical disc medium 11 and operation of reading data from the optical disc medium 11, performed by the optical disc reading/writing device 10, have been explained. As for the operation of writing data, it has been explained that defect management information is to be updated when a new defect is found.

If a DMA set having been used is not suitable for use any more due to update of the defect management information, a use of another DMA set starts, instead of the DMA set having been used. With this operation, selection information must be updated.

Next, operation of updating defect management information and selection information on the optical disc medium 11 will be explained. The operation is also performed in the information reading/writing device shown in FIG. 9.

Figure 6:
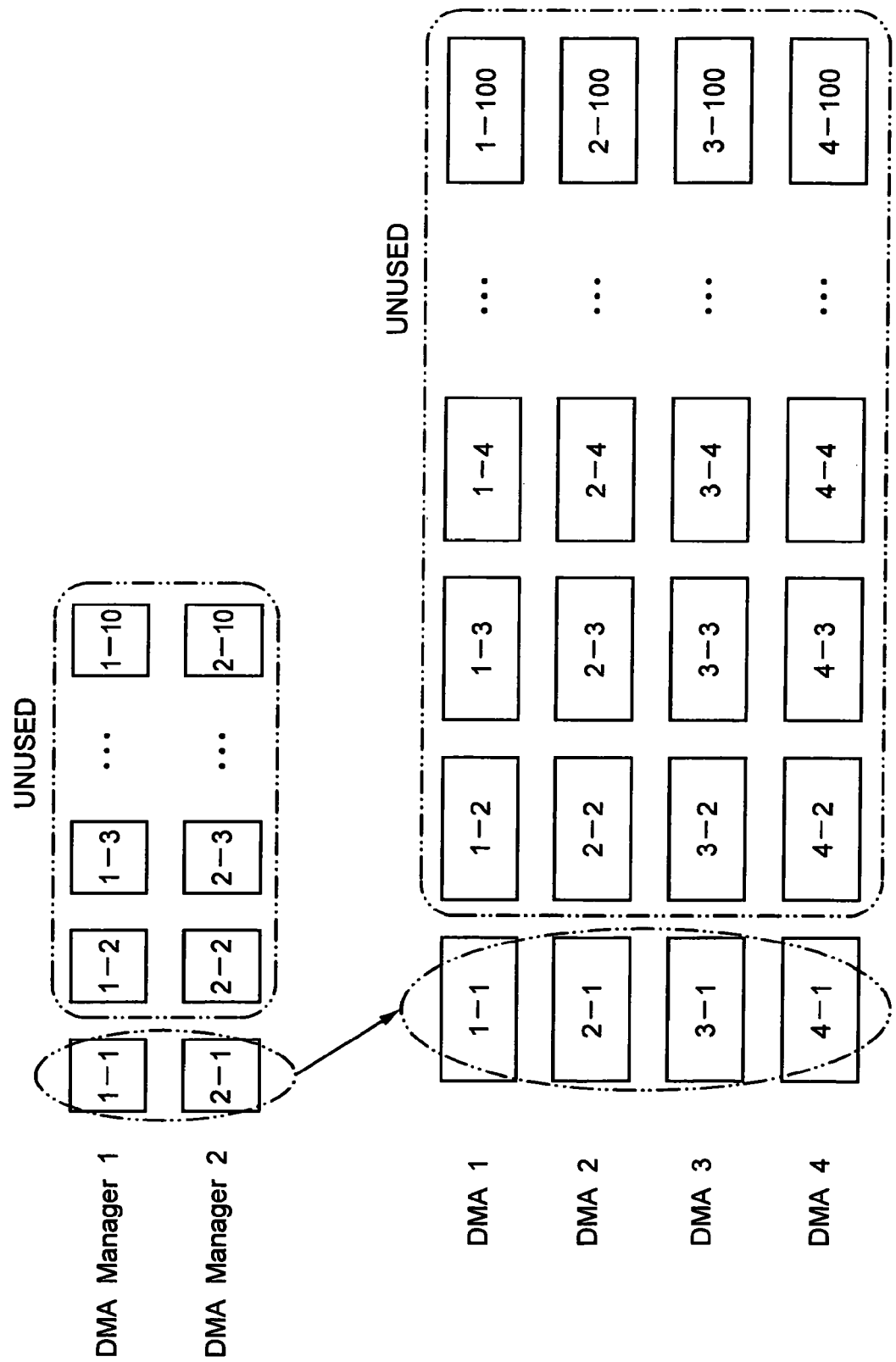
FIG. 6 is an explanatory diagram showing a defect information management method according to an embodiment 4 of the present invention, showing states of DMA sets and DMA manager sets right after initialization of an information recording medium.

In the following explanation, one-hundred DMA sets and ten DMA manager sets are present as shown in FIG. 6. Explanation will be given on the premise that the first DMA set #1 and the first DMA manager set #1 are usable.

When the DMA set #1 and the DMA manager set #1 are usable, the used state of DMA sets and DMA manager sets right after initializing the optical disc medium will become one shown in FIG. 6. As shown in FIG. 6, the DMA manager set #1 consists of two DMA manager areas 1-1 and 2-1, and the DMA set #1 consists of four DMAs 1-1, 2-1, 3-1 and 4-1. On the DMA manager areas 1-1 and 2-1, selection information of the same content is written, and on the DMAs 1-1, 2-1, 3-1 and 4-1, defect management information of the same content is written. Further, on the DMA manager areas 1-1 and 2-1, selection information indicating the DMAs 1-1, 2-1, 3-1 and 4-1 are written. Defect management information to be used is defect management information written on the DMA 1-1, 2-1, 3-1 and 4-1.

In the state shown in FIG. 6, DMA sets #2 to #100 and DMA manager sets #2 to #10 are unused. In order to show they are unused, areas of the DMA sets #2 to #100 and the DMA manager sets #2 to #10 may be filled with special data structures or special byte data such as FFh. Further, when the optical disc medium is initialized, the selection management unit 18b initializes the value of the DMA manager update counter, which is one of the data structures of the selection information shown in FIG. 5, to 00h, and writes it on the DMA manager areas 1-1 and 2-1.

When writing data onto the user area of the optical disc medium shown in FIG. 1, if it was determined that defect of the optical disc medium existed in a part of the user area so the control unit 18c performed alternation processing, the written contents of the DMA set #1 and the DMA manager set #1 are updated following the procedure described below. It is assumed that the value of the DMA manager update counter, which is one of the data structures of the selection information shown in FIG. 5, is 00h.

First, in step 1, when the defect management unit 18a is notified from the control unit 18c that alternation processing has been performed, the defect management unit 18*a* obtains information associating with the alternation processing, and changes the defect management information stored.

Further, the defect management unit 18*a* controls the positioning circuit 13, outputs the updated defect management information to the optical head 12 through the modulation circuit 15 and the writing control circuit 14, and writes the defect management information about the optical disc medium 11 on the four DMAs 1-1, 2-1, 3-1 and 4-1 included in the DMA set #1 in use.

Next, the processing moves to step 2. The defect management unit 18*a* controls the positioning circuit 13, the optical head 12, the signal processing circuit 16 and the demodulation circuit 17 so as to read the DMAs 1-1, 2-1, 3-1 and 4-1 to thereby check the state after writing of the DMA set #1.

In the step 2, if it is determined that the DMA set #1 has been updated normally, the DMA set to be used is not changed, so there is no need to change the selection information. Therefore, the operation of updating the defect management information and the selection information on the optical disc medium 11 is completed at this point. In such a case, although the content of the defect management information has been changed, the defect management information area and the selection information area of the optical disc medium 11 remain in the state shown in FIG. 6. The selection information written on the DMA manager set #1 is used as selection information, and the defect management information written on the DMA set #1 is used as defect management information. The selection information written on the DMA manager set #1 will indicate the DMA set #1.

If it is determined that the DMA set #1 has not been updated normally due to deterioration caused by overwriting for example, the processing moves to step 3.

In step 3, the defect management unit 18*a* repeats operation of writing defect management information onto the DMA set and operation of checking the state after writing of DMA set, and searches the DMA sets #2 to #100 sequentially until a DMA set in which update writing of defect management information was able to be performed normally is found. Assuming that a DMA set found is the DMA set #2, the defect management unit 18*a* starts using the new DMA set #2, instead of the DMA set #1. The DMA set #2 includes four DMAs 1-2, 2-2, 3-2 and 4-2.

The defect management unit 18*a* informs the selection management unit 18*b* of a DMA set to be used having been changed and information about the DMA set which has been newly used. The processing moves to step 4.

When the DMA set #2 is determined to be used, the selection information written on the DMA manager set #1 still indicates the DMA set #1, and it is required to change it so as to indicate the DMA set #2 which has been newly used.

In step 4, when the selection management unit 18*b* is informed from the defect management unit 18*a* that the DMA set used has been changed, the selection management unit 18*b* obtains information about the DMA set which has been newly used, and changes the selection information stored. Pieces of information of the byte positions 8 to 11, 12 to 15, 16 to 19 and 20 to 23 of the information unit of the selection information are changed to the first PSNs of the four DMAs 1-2, 2-2, 3-2 and 4-2 of the DMA set #2, and the value of the DMA manager update counter corresponding to the byte positions 4 to 7 is updated. Since the value of the DMA manager update counter in the DMA manager set #1 is 00h, 00h is updated to the incremented (+1) value 01h.

Further, the selection management unit 18*b* controls the positioning circuit 13, outputs the changed selection information to the optical head 12 through the modulation circuit 15 and the writing control circuit 14, and writes selection information about the optical disc medium 11 onto the two DMA manager areas 1-1 and 2-1 included in the DMA manager set #1.

Next, the processing moves to step 5. The selection management unit 18*b* controls the positioning circuit 13, the optical head 12, the signal processing circuit 16 and the demodulation circuit 17 so as to read the DMA manager areas 1-1 and 2-1, and checks the state after writing of the DMA manager set #1.

When it is determined that the DMA manager set #1 has been updated normally, the operation of updating defect management information and selection information on the optical disc medium 11 is completed at this point. In such a case, the defect information area and the selection information area of the optical disc medium 11 is in the state shown in FIG. 7. The selection information written on the DMA manager set #1 is used as selection information, and the defect management information written on the DMA set #2 is used as the defect management information. The selection information written on the DMA manager set #1 will indicate the DMA set #2.

Further, explanation will be given for a case where a DMA manager set was not able to be updated normally. The defect information area and the selection information area of the optical disc medium 11 is in the state shown in FIG. 7, and it is assumed that new alternation processing is caused associating with further writing operation to the data area.

First, in step 1, when the defect management unit 18*a* is notified from the control unit 18*c* that alternation processing has been performed, the defect management unit 18*a* obtains information associating with the alternation processing, and changes the defect management information stored.

Further, the defect management unit 18*a* controls the positioning circuit 13, outputs the updated defect management information to the optical head 12 through the modulation circuit 15 and the writing control circuit 14, and writes the defect management information about the optical disc medium 11 on the four DMAs 1-2, 2-2, 3-2 and 4-2 included in the DMA set #2 in use.

Next, the processing moves to step 2. The defect management unit 18*a* controls the positioning circuit 13, the optical head 12, the signal processing circuit 16 and the demodulation circuit 17 so as to read the DMAs 1-2, 2-2, 3-2 and 4-2 to thereby check the state after writing of the DMA set #2.

In the step 2, if it is determined that the DMA set #2 has been updated normally, the DMA set to be used is not changed, so there is no need to change the selection information. Therefore, the operation of updating the defect management information and the selection information on the optical disc medium 11 is completed at this point. In such a case, although the content of the defect management information has been changed, the defect information area and the selection information area of the optical disc medium 11 remain in the state shown in FIG. 7. The selection information written on the DMA manager set #1 is used as selection information, and the defect management information written on the DMA set #2 is used as defect management information. The selection information written on the DMA manager set #1 will indicate the DMA set #2.

If it is determined that the DMA set #2 has not been updated normally due to deterioration caused by overwriting for example, the processing moves to step 3.

In step 3, the defect management unit 18*a* repeats operation of writing defect management information onto the DMA set and operation of checking the state after writing of the DMA set, and searches the DMA sets #3 to #100 sequentially until a DMA set in which update writing of defect management information was able to be performed normally is found. Assuming that a DMA set found is the DMA set #3, the defect management unit 18a starts using the new DMA set #3, instead of the DMA set #2. The DMA set #3 includes four DMAs 1-3, 2-3, 3-3 and 4-3.

The defect management unit 18a informs the selection management unit 18b of a DMA set to be used having been changed and information about the new DMA set which has been newly used. The processing moves to step 4.

When the DMA set #3 is determined to be used, the selection information written on the DMA manager set #1 still indicates the DMA set #2, and it is required to change it so as to indicate the DMA set #3 which has been newly used.

Figure 7:
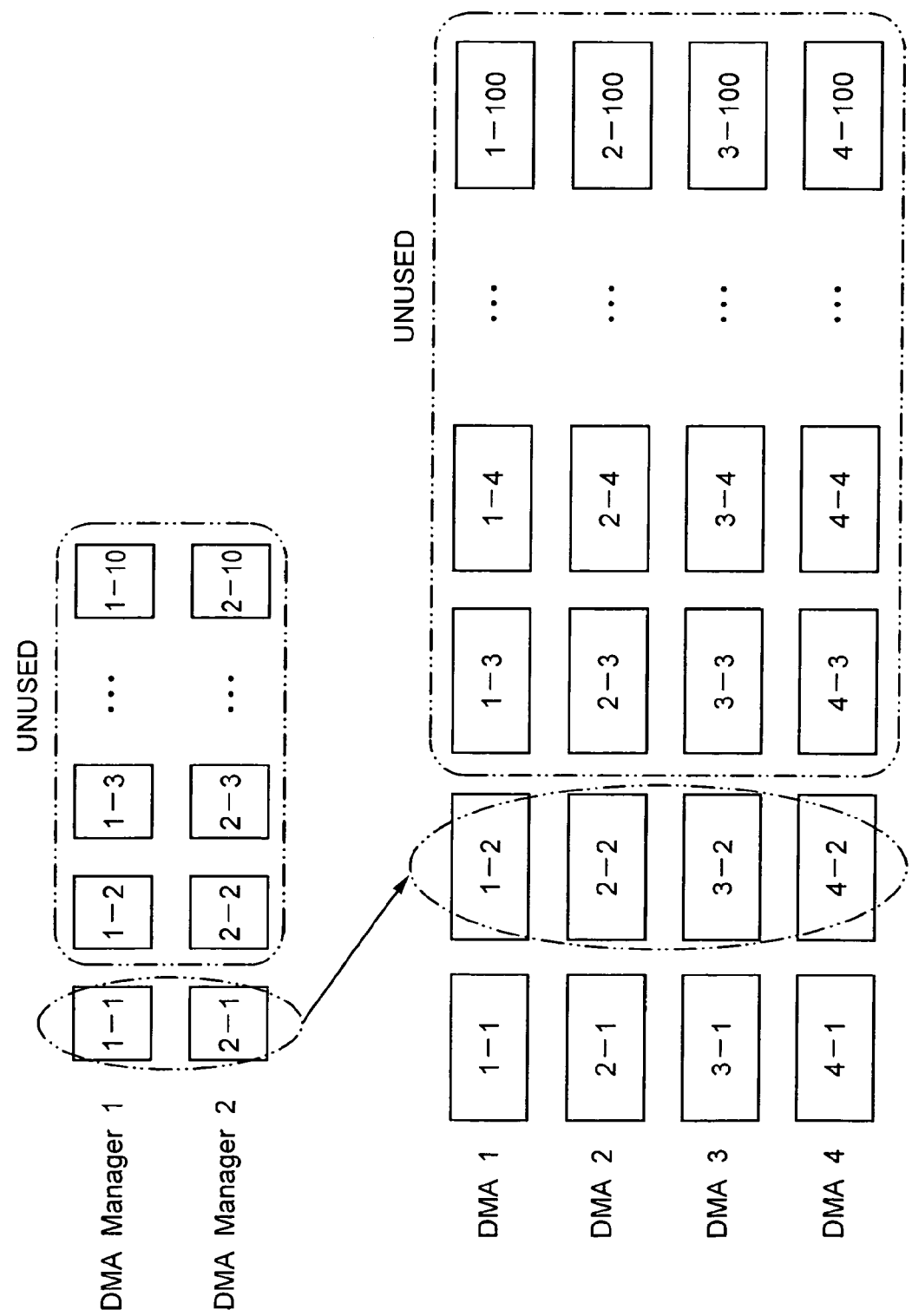
FIG. 7 is an explanatory diagram showing a defect information management method according to an embodiment 4 of the present invention, showing states of DMA sets and DMA manager sets when the information recording medium is in use.

In step 4, when the selection management unit 18b is informed from the defect management unit 18a that the DMA set used has been changed, the defect management unit 18a obtains information about the DMA set newly used, and changes the selection information stored. Pieces of information of the byte positions 8 to 11, 12 to 15, 16 to 19 and 20 to 23 of the information unit of the selection information are changed to the first PSNs of the four DMAs 1-3, 2-3, 3-3 and 4-3 of the DMA set #3, and the value of the DMA manager update counter corresponding to the byte position 4 to 7 is updated. Since the value of the DMA manager update counter in the DMA manager set #1 was 01h in the state shown in FIG. 7, 01h is updated to the incremented (+1) value 02h.

Further, the selection management unit 18b controls the positioning circuit 13, outputs the changed selection information to the optical head 12 through the modulation circuit 15 and the writing control circuit 14, and writes selection information about the optical disc medium 11 onto the two DMA manager areas 1-1 and 2-1 included in the DMA manager set #1.

Next, the processing moves to step 5. The selection management unit 18b controls the positioning circuit 13, the optical head 12, the signal processing circuit 16 and the demodulation circuit 17 so as to read the DMA manager areas 1-1 and 2-1, and checks the state after writing of the DMA manager set #1.

When it is determined that the DMA manager set #1 has been updated normally, the operation of updating defect management information and selection information on the optical disc medium 11 is completed at this point.

If it is determined that the DMA manager set #1 has not been updated normally due to deterioration caused by overwriting or the like, the processing moves to step 6.

In step 6, the selection management unit 18b repeats operation of writing selection information onto the DMA manager set and operation of checking the state after writing of the DMA manager set, and searches the DMA manager sets #2 to #10 sequentially until a DMA manager set in which update writing of the selection information was able to be performed normally is found. Assuming that the DMA manager set found is the DMA manager set #2, the DMA manager set #2 includes four DMA manager areas 1-2, 2-2, 3-2 and 4-2.

In the step 6, when the selection management unit 18a founds that the DMA manager set that update of selection information was able to be performed normally is the DMA manager set #2, the selection management unit 18a starts using the newly found DMA manager set #2.

The operation of updating the defect management information and selection information on the optical disc medium 11 is completed at this point. In such a case, the defect management area and the selection information area on the optical disc medium 11 are in the state shown in FIG. 8. The selection information written on the DMA manager set #2 is used as selection information, and the defect management information written on the DMA set #3 is used as defect management information. The selection information written on the DMA manager set #2 will indicate the DMA set #3.

Next, explanation will be given for the procedure that the defect management unit 18a and the selection management unit 18b specify a DMA set on which the latest defect management information to be used is written based on the selection information. Before reading or writing data from/to the user area of the optical disc medium 11, the optical disc reading/writing device 10 is required to obtain the defect management information about the optical disc medium 11.

The selection management unit 18b reads out the written contents from all areas of the DMA manager sets #1 to #10 by using the optical head 12, the positioning control circuit 13, the signal processing circuit 16 and the modulation circuit 17. Then, the selection management unit 18b selects a DMA manager set to which a DMA manager area where selection information of the largest DMA manager update counter value is written belongs, among DMA manager areas in which error correction is possible and effective data structure is written, as a DMA manager set on which the latest selection information to be used is written. Further, the selection management unit 18b notifies the defect management unit 18a of selection information having the largest value of the DMA manager update counter among pieces of selection information written on the selected DMA manager set.

The defect management unit 18a specifies the DMA set indicated by the selection information notified from the selection management unit 18b as a DMA set to be used, and reads out defect management information from the corresponding DMA set by using the optical head 12, the positioning control circuit 13, the signal processing circuit 16 and the demodulation circuit 17.

Figure 8:
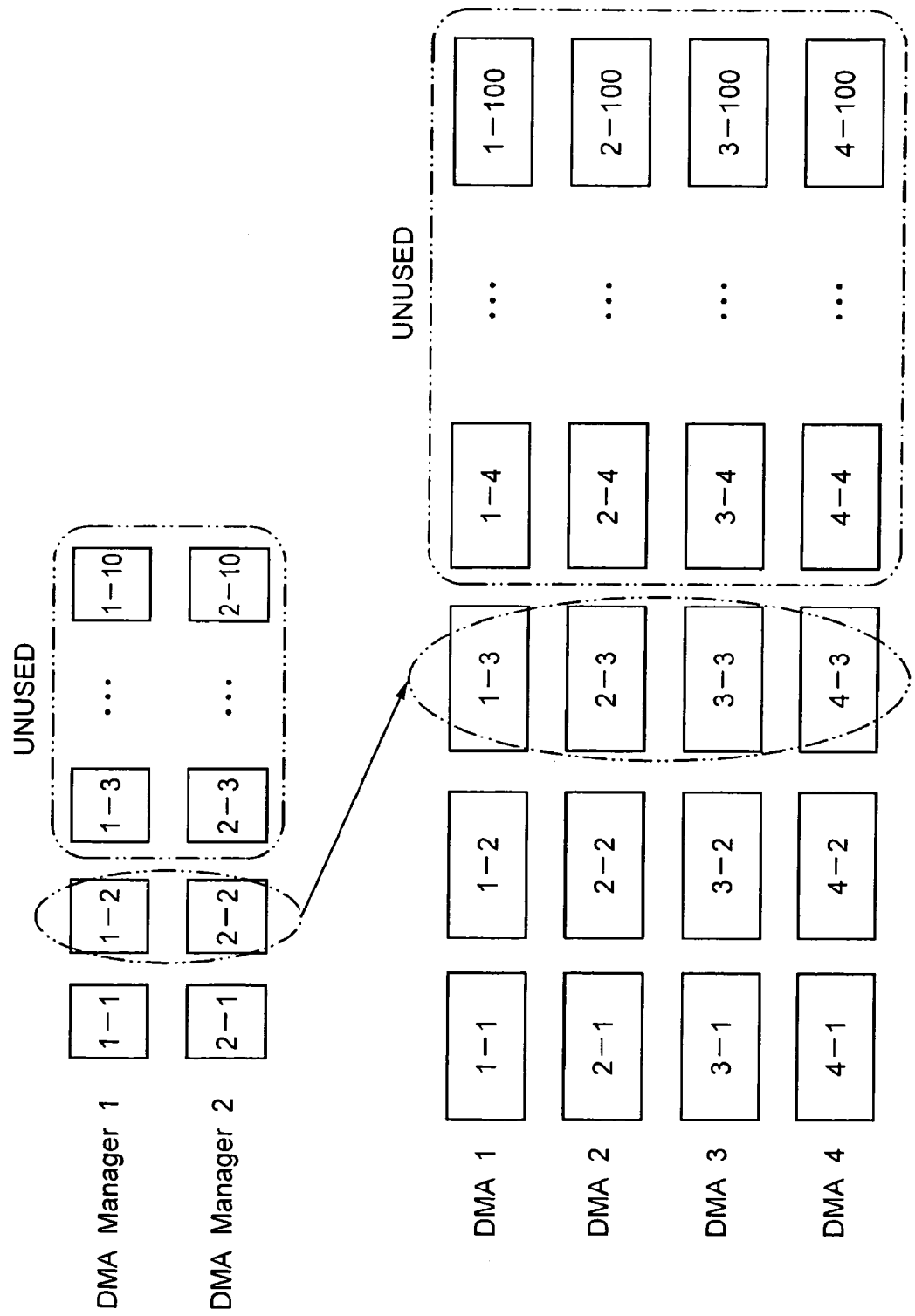
FIG. 8 is an explanatory diagram showing the defect information management method according to the embodiment 4 of the present invention, showing states of DMA sets and DMA manager sets when the information recording medium is in use.

In the case of FIG. 8, a DMA manager set on which selection information having the largest value of the DMA manager update counter is written is the DMA manager set #2, and selection information extracted from the DMA manager set #2 is outputted from the selection management unit 18b to the defect management unit 18a. Since the DMA set indicated by the selection information of the DMA manager set #2 is DMA set #3, the defect management unit 18a specifies the DMA set #3 as a DMA set to be used, and extracts the defect management information. Based on the content of the DMA set #3 specified, the control unit 18c performs reading or writing to the optical disc medium 11. As described above, the history information may be update number data which is counted each time the selection information is updated, or flag data in which a bit of the same number as the number of updates of the selection information is set to 0 or 1.

Note that in an information reading device not including the writing control circuit 14 and the demodulation circuit 15 shown in FIG. 9, only operation of specifying the DMA set on which the latest defect management information to be used is written is performed, based on history information included in the selection information which is information showing the written position of the latest defect management information at the time of writing the selection information. Further, in an information reading/writing device in which written contents on DMAs and DMA manager areas are not updated although it is an information reading/writing device, only operation of specifying the DMA set on which the latest defect management information to be used is written is performed, based on history information included in the selection information which is information showing the written position of the latest defect management information at the time of writing the selection information.

Embodiment 4

Next, another defect information management method according to an embodiment of the present invention will be explained as an embodiment 4.

The defect management method according to the present embodiment 4 is same as the embodiment 3 in the configuration that processing from step 1 to step 6 is performed, and processing of writing defect management information about an optical disc medium on DMA sets and writing selection information for selecting a DMA set on DMA manager sets is performed. Further, the method of updating contents of DMA sets and DMA manager sets is same as that of the embodiment 3.

Explanation will be given for the procedure of specifying the latest DMA set to be used based on selection information written on a DMA manager set, in the defect information management method according to the present embodiment 4.

The selection management unit 18b reads out selection information written in all DMA manager sets included in the DMA manager sets #1 to #10 by using the optical head 12, the positioning control circuit 13, the signal processing circuit 16 and the demodulation circuit 17. Then, among the pieces of selection information read out from all DMA manager sets, the selection management unit 18b selects the DMA manager set to which a DMA manager area where selection information of the largest value of the DMA manager update counter is written belongs, among the DMA manager areas in which error correction is possible and effective data structure is included, as a DMA manager set on which the latest selection information to be used is written.

Next, if all of the pieces of selection information written on the selected DMA manager set have the same content, the selection management unit 18b notifies the defect management unit 18a of the selection information written on the DMA manager set together with information indicating that the reliability is high.

On the other hand, if different pieces of selection information are written on the selected DMA manager set, the selection management unit 18b notifies the defect management unit 18a of selection information having the largest value of the DMA manager update counter together with information indicating that the reliability is low.

Next, if the reliability of the selection information notified from the selection management unit 18b is high, the defect management unit 18a specifies the DMA set indicated by the selection information notified from the selection management unit 18b as a DMA set to be used, and reads out defect management information from the corresponding DMA set by using the optical head 12, the positioning control circuit 13, the signal processing circuit 16 and the demodulation circuit 17.

On the other hand, if the reliability of the selection information notified from the selection management unit 18b is low, the defect management unit 18a determines that the selection information notified from the selection management unit 18b as candidate information which has not been settled. In order to specify a DMA set on which the latest defect management information is written among the DMA sets #1 to #100, the defect management unit 18a searches the DMA sets sequentially while limiting the search range so as to specify the DMA set on which the latest management information is written, based on the selection information determined as the candidate information, by using the optical head 12, the positioning control circuit 13, the signal processing circuit 16 and the demodulation circuit 17. More specifically, if the selection information determined as the candidate information indicates the DMA set #D for example, the defect management unit 18a searches the DMA sets sequentially with the DMA set #D being the base point to thereby specify the DMA set on which the latest management information is written.

Similarly, even when the DMA manager set determined as a DMA manager set on which the latest selection information to be used is written includes a DMA manager area in which error correction is not possible or ineffective data structure is included, by processing it as selection information of low reliability same as the case of no coincidence of contents of selection information being achieved, it is possible to select a DMA set on which the latest defect management information to be surely used is written.

In the present embodiment 4, in an information reading device not including the writing control circuit 14 and the modulation circuit 15 shown in FIG. 9, only operation of specifying a DMA set on which the latest defect management information to be used is written is performed, based on history information included in the selection information which is information showing the position where the latest defect management information at the time of writing the selection information is written. Further, in an information reading/writing device in which written contents on the DMAs and DMA manager areas are not updated although it is an information reading/writing device, only operation of specifying a DMA set on which the latest defect management information to be used is written is performed, based on history information included in the selection information which is information showing the written position of the latest defect management information at the time of writing the selection information.

As described above, by using an information recording medium, a defect information management method, an information reading/writing device and an information reading device according to the embodiments of the present invention, it is possible to surely specify a DMA set on which the latest defect management information is written in a short time, even though pieces of selection information are different between the DMA manager areas within the DMA manager set selected as ones on which the latest selection information is written.

In order to specify the latest DMA manager set, it must be searched from a group of DMA manager sets within the selection information area. In the embodiments of the present invention, it is only required to evaluate the history information area of the DMA manager area, since there is history information from which whether it is the latest can be determined directly, whereby the searching procedure can be simplified.

Further, even when the DMA manger set selected as one on which the latest selection information is written has low reliability, by utilizing selection information included in the selected DMA manager set, it is possible to surely specify a DMA set on which the latest defect management information is written in a short time.

Note that it is possible to specify a DMA set on which the latest defect management information is written by searching the DMA sets sequentially while not using selection information. However, in the example described above, there are one-hundred sets of DMAs and each of which consists of four DMAs, so it takes too much time to search sequentially without limiting the search range, whereby it is not practical. In view of this, in the present invention, by using selection information written on a DMA manger set selected so as to limit the search range, it is possible to reduce the time significantly by limiting the search range.

INDUSTRIAL APPLICABILITY

As described above, the present invention can be applied to an information recording medium having a defect information area capable of recording plural sets of defect management information and a selection information area capable of recording plural sets of selection information for selecting a set of defect management information from the defect information area. Further, the present invention can specify defect management information to be used in a short time with high reliability.

What is claimed is:

1. An information recording medium comprising:
   an information area for managing a defect of a data area, wherein
   the information area has a defect information area, and a selection information area,
   the defect information area is able to be recorded with plural sets of a defect management information relating to the data area,
   the selection information area is able to be recorded with plural sets of selection information for selecting a set of latest defect management information from the defect information area,
   the selection information indicates a position data where the latest defect management information is written at a time of writing the selection information, and
   the selection information includes history information for determining a set of latest selection information from the plural sets of selection information, and the history information indicating that the selection information is updated.

2. The information recording medium, as claimed in claim 1, wherein the history information is update number data which is counted each time the selection information is updated.

3. The information recording medium, as claimed in claim 1, wherein the history information is flag data in which a bit of a same number as an update number of the selection information is set to 0 or 1.

4. A defect management method for a reading/writing device writing to an information recording medium with which defect information relating to a data area of an information recording medium is managed, the method comprising the steps of:
   the reading/writing device writing management information of a defect caused in the data area of the information recording medium onto a defect information area; and
   the reading/writing device writing selection information indicating a written position of latest defect management information written on the defect information area, including history information for determining a set of latest selection information from the plural sets of selection information, and the history information indicating the selection information is updated, wherein
   the information recording medium has the defect information area and the selection information area,
   the defect information area is able to be recorded by the reading/writing device with plural sets of management information of a defect caused in the data area,
   the selection information area is able to be recorded by the reading/writing device with plural sets of selection information for selecting a set of the latest defect management information from the defect information area.

5. The defect management method, as claimed in claim 4, wherein the history information is updated each time the selection information is updated.

6. A defect management method for a reading/writing device reading and/or writing from or to an information recording medium with which defect information relating to a data area of an information recording medium is read so as to manage a defect of the data area based on the information, the method comprising the step of:
   the reading/writing device specifying latest selection information from plural sets of selection information written on the selection information area based on history information, wherein
   the information recording medium has a defect information area and a selection information area,
   the defect information area is able to be recorded by the reading/writing device with plural sets of management information of a defect caused in the data area,
   the selection information area is able to be recorded by the reading/writing device with plural sets of selection information for selecting a set of latest defect management information from the defect information area, and
   the selection information includes the history information for determining a set of latest selection information from the plural sets of selection information, and the history information indicating the selection information is updated.

7. A defect management method for a reading/writing device reading and/or writing from or to an information recording medium with which defect information relating to a data area of the information recording medium is read so as to manage the defect information of the data area, the method comprising the steps of:
   the reading/writing device selecting a candidate of latest selecting information from plural sets of the selection information written on selection management area based on history information, and
   the reading/writing device specifying the latest defect information from plural sets of the defect information written on a defect information area based on the candidate selected as the least selection information, wherein
   the information recording medium has a defect information area and a selection information area,
   the defect information area is recorded by the reading/writing device with plural sets of management information of a defect caused in the data area,
   the selection information area is able to be recorded by the reading/writing device with plural sets of selection information for selecting a set of latest defect management information from the defect information area, and
   the selection information includes the history information indicating that the selection information is updated.

8. An information reading/writing device which reads and writes a data from/onto a data area of an information recording medium, the device comprising:
   a defect management unit for reading management information of a defect caused in the data area and writing the defect management information onto a clear defect information area of the information recording medium,
   a selection management unit for reading selection information from a selection information area of the information recording medium so as to select a set of defect management information from a defect information area,
   a control unit for controlling reading/writing data from/onto the data area based on written information on the defect information area and the selection information area, wherein
   the information recording medium has the defect information area and the selection information area, the defect information area is able to be written with plural sets of management information of a defect caused in the data area, the selection information area is able to be recorded with plural sets of selection information for selecting a set of the defect management information from the defect information area, and the selection management unit records the selection information indicating a position data where latest defect management information is recorded in the defect information area, including history information indicating that the selection information is updated.

9. The information reading/writing device, as claimed in claim 8, wherein the selection management unit has a function of updating the history information each time the selecting information is updated.

10. An information reading/writing device which reads and writes data from/onto a data area of an information recording medium, the device comprising:

a defect management unit for reading management information of a defect caused in the data area from a defect information area of the information recording medium and for writing the defect management information onto a clear defect information area, a selection management unit for reading selection information from a selection information area of the information recording medium so as to select a set of defect management information from the defect information area and for writing the selection information onto a clear selection information area, and a control unit for controlling reading/writing data from/onto the data area based on written information on the defect information area and the selection information area, wherein the information recording medium has the defect information area and the selection information area, the defect information area is able to be recorded with plural set of management information of a defect caused in the data area, the selection information area is able to be recorded with plural sets of selection information for selecting a set of defect management information from the defect information area, the selection information includes history information indicating that the selection information is updated, and the selection unit specifies latest selection information from plural sets of the selection information written on the selection information area, based on the history information.

11. An information reading/writing device which reads and writes data from/onto a data area of an information recording medium, the device comprising:

a defect management unit for reading management information of a defect caused in the data area and writing the defect managing information onto a clear defect information area, a selection management unit for reading selection information from a selection information area of the information recording medium so as to select a set of defect management information from the defect information area, and a control unit for controlling reading/writing data from/onto the data area based on written information on the defect information area and the selection information area, wherein the information recording medium has the defect information area and the selection information area, the defect information area is able to be recorded with plural sets of management information of a defect caused in the data area, the selection information area is able to be recorded with plural sets of selection information for selecting a set of the defect management information form the defect information area, the selection information includes history information indicating that the selection information is updated, the selection management unit selects a candidate of latest selection information from plural sets of selection information written on the selection management area, based on the history information, and the defect management unit specifies latest defect management information from plural sets of the defect management information written on the defect information area, based on the selection information selected as the candidate.

12. An information reading device which reads data from the data area of an information recording medium, the device comprising:

a defect management unit for reading management information of a defect caused in the data area from a defect information area of the information recording medium, a selection management unit for reading selection information from a selection information area of the information recording medium so as to select a set of defect management information from the defect information area, and a control unit for controlling reading data from the data area based on written information on the defect information area and the selection information area, wherein the information recording medium has the defect information area and the selection information area, the defect information area is able to be recorded with plural sets of management information of a defect caused in the data area, the selection information area is able to be recorded with plural sets of selection information for selecting a set of management information from the defect information area, the selection information includes history information indicating that the selection information is updated, and the selection management unit specifies latest selection information from plural sets of the selection information written on the selection information area, based on the history information.

13. An information reading device which reads data from a data area of an information recording medium, the device comprising:

a defect management unit for reading management information of a defect caused in the data area from a defect information area of the information recording medium, a selection management unit for reading selection information from a selection information area of the information recording medium so as to select a set of defect management information from the defect information area, and a control unit for controlling reading data in the data area based on written information on the defect information area and the selection information area, wherein the information recording medium has the defect information area and the selection information area, the defect information area is able to be recorded with plural sets of management information of a defect caused in the data area, the selection information area is able to be recorded with plural sets of selection information for selecting a set of the defect management information form the defect information area, the selection information includes history information indicating that the selection information is updated, the selection management unit selects a candidate of latest selection information from plural sets of the selection information written on the selection management area, based on the history information, the defect management unit specifies latest defect management information from plural sets of the defect management information written on the defect information area, based on selection information selected as the candidate.

* * * * *